(12) United States Patent
Beall (10) Patent No.: US 11,673,092 B2
(45) Date of Patent: Jun. 13, 2023

(54) REVERSE OSMOSIS SYSTEM CONTROL VALVES

(71) Applicant: Topper Manufacturing Corporation, Torrance, CA (US)

(72) Inventor: Timothy Allen Beall, Redondo Beach, CA (US)

(73) Assignee: Topper Manufacturing Corporation, Torrance, CA (US)

( * ) Notice: Subject to any disclaimer, the term of this patent is extended or adjusted under 35 U.S.C. 154(b) by 43 days.

(21) Appl. No.: 17/315,980

(22) Filed: May 10, 2021

(65) Prior Publication Data

US 2021/0268441 A1 Sep. 2, 2021

Related U.S. Application Data

(63) Continuation-in-part of application No. 15/624,534, filed on Jun. 15, 2017, now Pat. No. 11,000,807.

(Continued)

(51) Int. Cl.
*B01D 61/02* (2006.01)
*B01D 61/08* (2006.01)
(Continued)

(52) U.S. Cl.
CPC ........... *B01D 61/12* (2013.01); *B01D 61/025* (2013.01); *B01D 61/20* (2013.01); *C02F 1/008* (2013.01);
(Continued)

(58) Field of Classification Search
CPC ..... B01D 2313/18; B01D 61/12; C02F 1/008; C02F 2201/004; C02F 2201/005
See application file for complete search history.

(56) References Cited

U.S. PATENT DOCUMENTS 4,604,194 A 8/1986 Entingh
4,705,625 A 11/1987 Hart, Jr.
(Continued)

FOREIGN PATENT DOCUMENTS

CN 1177072 A 3/1998
CN 201106706 Y 8/2008
(Continued)

OTHER PUBLICATIONS

Office Action dated Jun. 16, 2021, Chinese Patent Application No. 201780050151.X, 19 pp. total.
(Continued)

*Primary Examiner* — Bradley R Spies
(74) *Attorney, Agent, or Firm* — Womble Bond Dickinson (US) LLP (57) ABSTRACT

A control valve for a reverse osmosis water purifying system provides a feed water port, a squeeze water port, a drain port, and a product water connection, each of which open into a bore. A first, second, and third O-rings are located in the bore successively between the feed water port, the squeeze water port, the drain port, and the product water connection. A control piston is moveably located in the bore of the housing. The control piston includes a vent/drain well in which a side is chamfered and at least one recess disposed around an end of the control piston. The vent/drain well provides a fluid passage between the squeeze water port and the drain port when the vent/drain well passes over the second O-ring. The fluid passage includes an opening formed between the second O-ring and the chamfered side of the vent/drain well, where the size of the opening is responsive to the position of the control piston.

20 Claims, 5 Drawing Sheets

Related U.S. Application Data (60) Provisional application No. 62/351,494, filed on Jun. 17, 2016, provisional application No. 62/351,188, filed on Jun. 16, 2016.

(51) Int. Cl.
  *B01D 61/12* (2006.01)
  *F16K 11/07* (2006.01)
  *B01D 61/20* (2006.01)
  *C02F 1/00* (2023.01)
  *C02F 1/44* (2023.01)

(52) U.S. Cl.
  CPC .......... *F16K 11/0716* (2013.01); *B01D 61/08* (2013.01); *B01D 2311/14* (2013.01); *B01D 2313/04* (2013.01); *B01D 2313/18* (2013.01); *C02F 1/441* (2013.01); *C02F 2201/004* (2013.01); *C02F 2201/005* (2013.01)

(56) References Cited

U.S. PATENT DOCUMENTS

| | | | |
|---|---|---|---|
| 5,845,679 A | 12/1998 | Hayashi et al. | |
| 6,110,360 A | 8/2000 | Hart, Jr. | |
| 7,601,256 B2 | 10/2009 | Beall | |
| 8,257,594 B2 | 9/2012 | Astle et al. | |
| 2006/0151033 A1 | 7/2006 | Rojanskiy et al. | |
| 2007/0045165 A1 | 3/2007 | Beall | |
| 2009/0060753 A1 | 3/2009 | Jones | |
| 2009/0200238 A1 | 8/2009 | Astle et al. | |
| 2010/0024893 A1 | 2/2010 | Beall | |
| 2010/0116724 A1 | 5/2010 | Schmitt | |
| 2010/0243942 A1 | 9/2010 | Burrows | |
| 2011/0132960 A1 | 6/2011 | Whitman et al. | |
| 2012/0260993 A1 | 10/2012 | Penning | |
| 2014/0102985 A1 | 4/2014 | Bassett et al. | |
| 2015/0083666 A1 | 3/2015 | Bassett et al. | |
| 2015/0225259 A1 | 8/2015 | Yamaoka et al. | |
| 2015/0298062 A1 | 10/2015 | Zhu | |
| 2016/0109029 A1 | 4/2016 | Dulin | |
| 2017/0361275 A1* | 12/2017 | Beall | B01D 61/20 |

FOREIGN PATENT DOCUMENTS

| | | |
|---|---|---|
| CN | 101296867 A | 10/2008 |
| CN | 102734500 A | 10/2012 |
| CN | 202812308 U | 3/2013 |
| CN | 104583133 A | 4/2015 |
| CN | 105130035 A | 12/2015 |
| WO | 2007/025125 A2 | 3/2007 |

OTHER PUBLICATIONS

Office Action dated Jan. 25, 2022, Chinese Patent Application No. 201780050151.X, 11 pp. total.

"International Search Report and Written Opinion of the International Searching Authority dated Oct. 27, 2017; International Application No. PCT/US2017/037938", Oct. 27, 2017.

"Invitation to Pay Additional Fees dated Aug. 28, 2017; International Application No. PCT/US2017/037938", Aug. 28, 2017.

* cited by examiner

REVERSE OSMOSIS SYSTEM CONTROL VALVES

CROSS REFERENCE TO RELATED APPLICATIONS

This application is a continuation-in-part of U.S. patent application Ser. No. 15/624,534, filed Jun. 15, 2017, which claims the benefit pursuant to 35 U.S.C. 119(e) of U.S. Provisional Application No. 62/351,188, filed Jun. 16, 2016, and U.S. Provisional Application No. 62/351,494, filed Jun. 17, 2016, all of which are hereby incorporated by reference in their entirety.

BACKGROUND

Field

The present invention relates to the field of reverse osmosis water filters; and more specifically, to control valves for reverse osmosis water filters.

Background

The present invention represents improvements in the reverse osmosis control valve disclosed in U.S. Pat. No. 6,110,360. That valve was a considerable advance in the art at the time of its development. However it still had some problems, which problems have been accentuated as reverse osmosis filter system performance in terms of rate of production of product water has greatly increased over the years, as more fully described below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Control valves in accordance with U.S. Pat. No. 6,110,360 were first introduced in Florida, typically a warm water market. The valve used a Teflon piston as stated in the patent, selected to avoid wear on the O-rings from piston motion, and proved to be a success as long as there was never a severe shift in water temperatures. However, when cutting the Teflon material at one temperature to fabricate the piston, then operating the control valve at a lower temperature, the piston will shrink beyond operational dimensions, with the result that the water system will drain on its own. While Teflon has the desired lubricity, it is too unstable a material to properly function over a substantial temperature range, as can be expected in probably most regions of the U.S. and many other countries. To overcome this problem, the present invention utilizes a much more stable family of plastics for the material of the control valve piston, namely, acetal types of plastic, such as by way of example, Delrin as manufactured by DuPont and Celcon as manufactured by Celanese. The acetal plastics are much more stable than Teflon and maintain the required dimensional tolerances over the required temperature range to provide highly satisfactory operation over any reasonable temperature range.

Also, the control valve of U.S. Pat. No. 6,110,360 was developed at a time when the daily output of a typical reverse osmosis membrane was on the order of 15 gallons per day. In that regard, it is important to note that in the design of the control valve of U.S. Pat. No. 6,110,360, all of the functional operations are related to timing—when to vent, when to turn off, when to turn on, etc. In that regard, the control valve is intended to operate in conjunction with reverse osmosis filter systems having a bladder in the product water storage tank, whereby product water may be added to the internal volume of the bladder while the outer surface of the bladder is vented to atmospheric pressure during product water generation, and to provide squeeze water, that is reverse osmosis filter membrane waste water at tap water pressure, to the outer surface of the bladder to pressurize the product water during product water dispensing.

Figure 1:
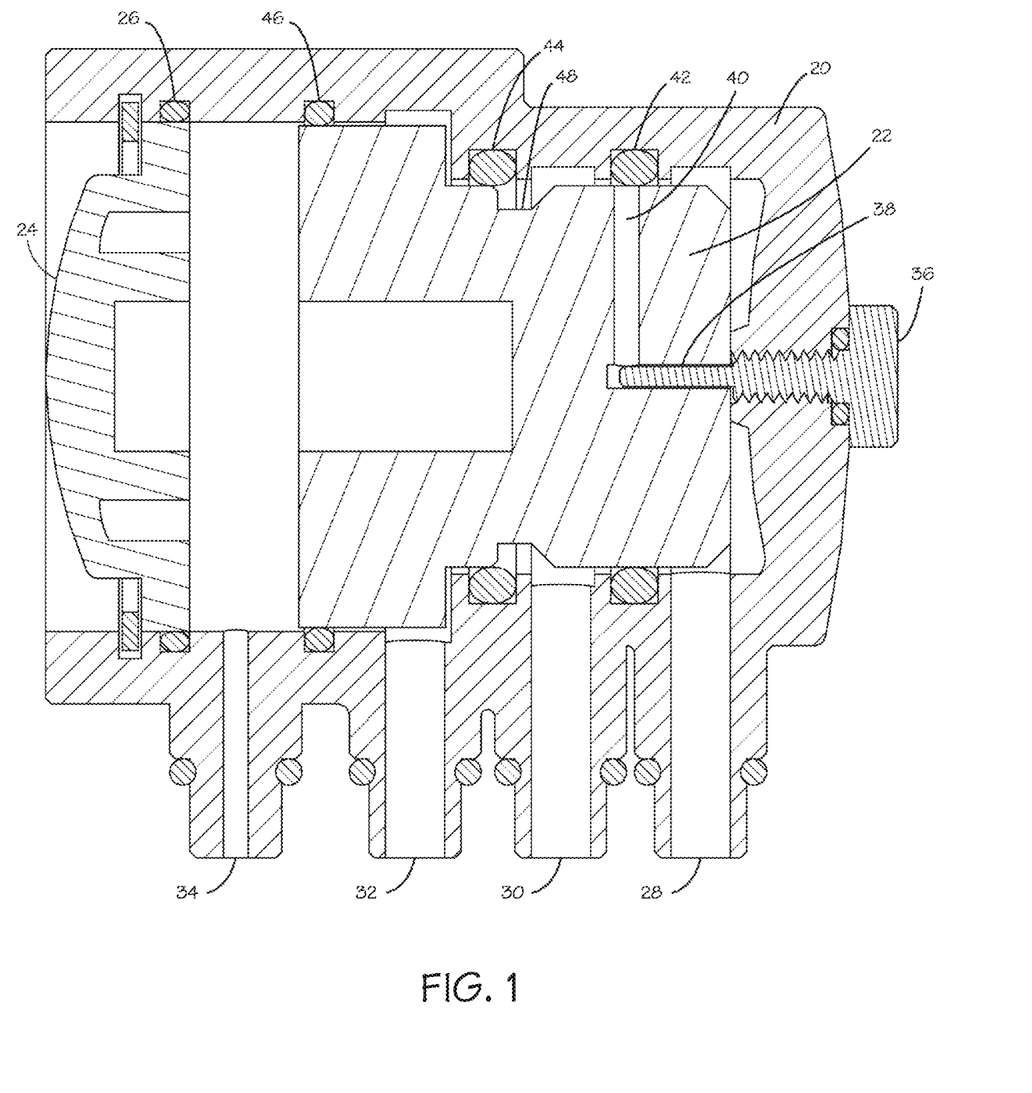
FIG. 1 illustrates a control valve in accordance with the present invention in a system shutoff position.
Figure 2:
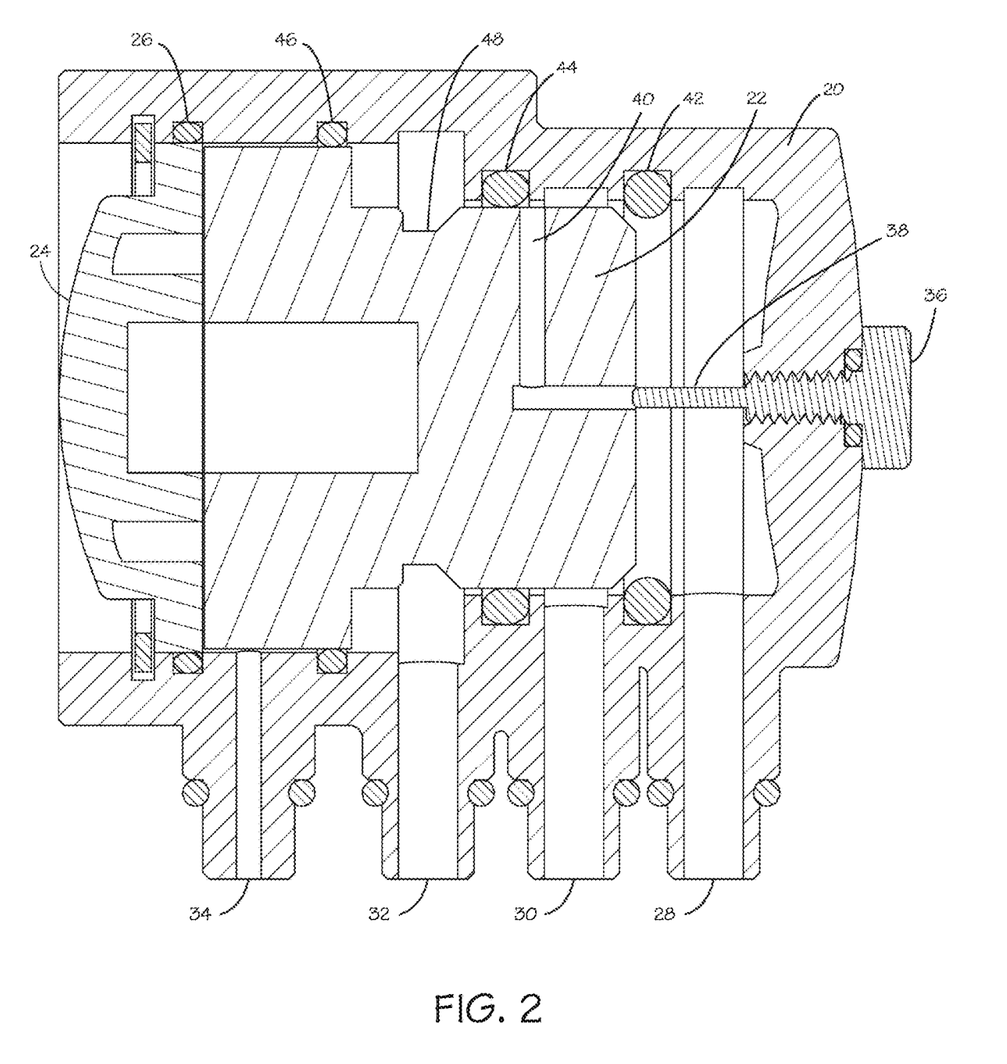
FIG. 2 illustrates the control valve of FIG. 1 in a product water dispensing position.
Figure 3:
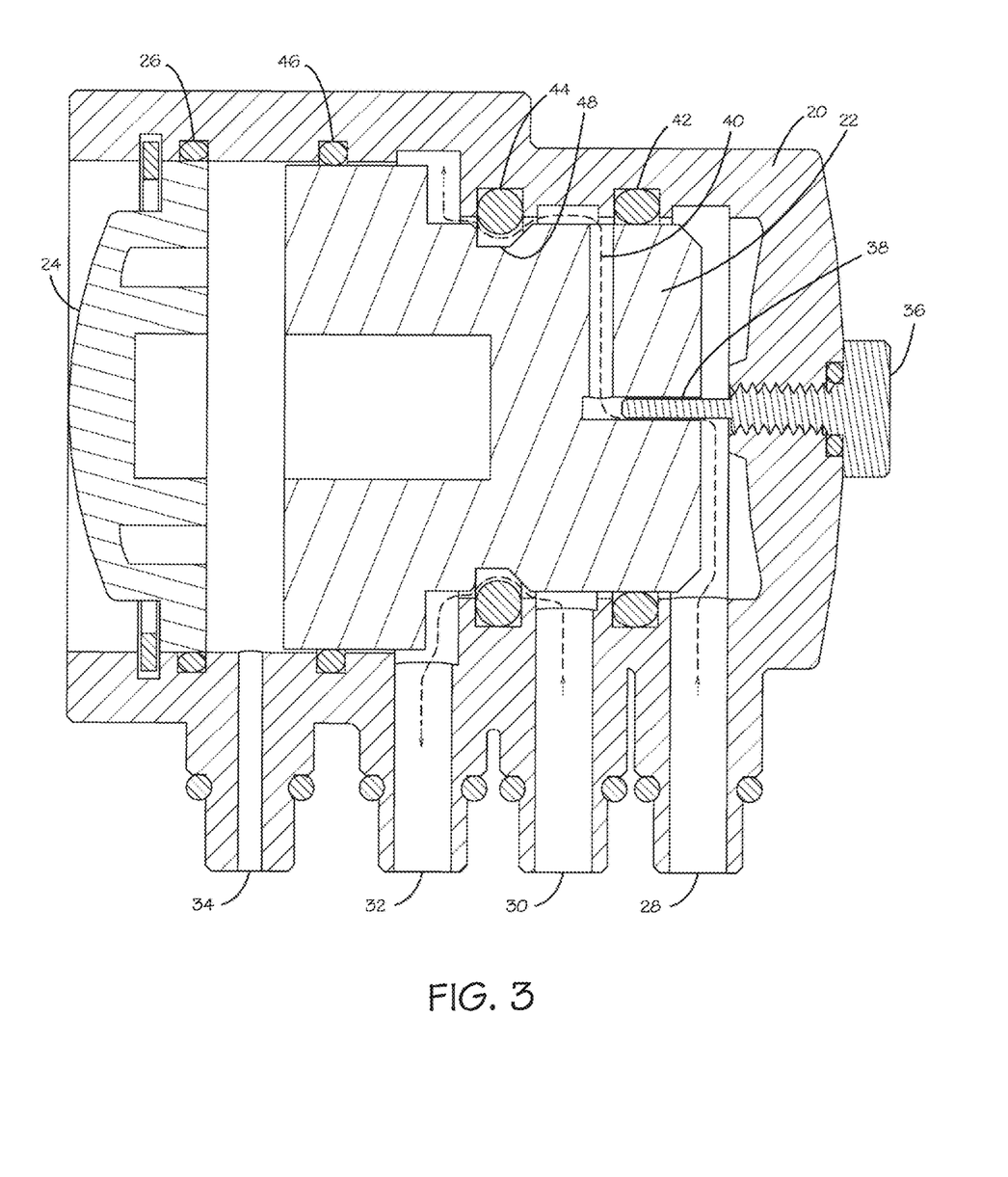
FIG. 3 illustrates the control valve of FIG. 1 in a product water production position.

FIGS. 1, 2 and 3 illustrate a control valve in accordance with the present invention wherein the major components of the control valve may be seen. The control valve includes a housing 20 with a control piston 22 therein, sealed at the left end by cap 24 and O-ring 26. The housing 20 includes four ports, namely a feed water port 28 (reverse osmosis filter membrane waste water at tap water pressure), a squeeze water port 30 and a drain port 32, together with product water connection 34. In these Figures, the cross section shown is a form of composite cross sections to place the ports 28, 30, and 32 and product water connection 34 in the same plane, which has distorted the control piston 22, though except for the flow path 40, the control piston 22 has a surface of revolution.

At the right end of housing 20 is a feed water metering screw 36 which has an extension 38 extending into an axial opening in the control piston 22, which together with flow path 40, allows a slow but positive rate of feed water through feed water port 28 when not blocked by O-rings between the housing 20 and the control piston 22, namely, O-ring 42.

In this embodiment, the reverse osmosis filter membrane is always exposed to the full feed water pressure in feed water port 28 and the left end, the larger end of control piston 22, is always exposed to a product water pressure through product water connection 34, which as shall be subsequently described, is isolated from reverse flow back to the product water storage tank by a check valve there between. Accordingly, as may be seen in FIG. 1, when the product water storage tank is full of product water, the product water pressure in the storage tank will increase by continued, though slower, production of product water to increase the pressure in the product water connection 34, ultimately forcing the control piston 22 to the far right position, as shown in FIG. 1, because of the difference in the areas of the two ends of the control piston 22. In this far right position, O-ring 42 blocks any feed water flow past the O-ring, stopping all water flow in the system. In that regard, as mentioned before, the reverse osmosis membrane in this embodiment is coupled to the raw water source (tap water) at all times, with feed water port 28 being coupled to the waste water outlet of the reverse osmosis filter unit. Accordingly, shutting off the flow through feed water port 28 shuts off all water flow through the system.

When a product water dispensing valve is opened to dispense the reverse osmosis filtered water, the product water pressure in product water connection 34 will immediately drop, allowing the feed water pressure in feed water port 28 to force the control piston 22 to the far left position, as shown in FIG. 2, moving the control piston past O-ring 42, but not past O-ring 44, so that now the feed water port 28 is coupled to the squeeze water port 30 to pressurize the outer surface of the bladder in the product water storage tank, which in turn forces product water within the bladder through the dispenser.

When the dispensing stops, the squeeze water port 30 is still coupled to the feed water port 28 so that the product water coupled to product water connection 34 is still at the squeeze water pressure, which is equal to the feed water pressure. Accordingly, control piston 22 will start to move to the right until the squeeze water port 30 is coupled to the drain port 32, as may be seen in FIG. 3. In this position, O-ring 42 blocks flow from feed water port 28 around the right end of control piston 22. Also, with the control piston 22 in the position shown in FIG. 3, the restricted feed water flow in flow path 40 is also coupled to the drain port 32 through vent/drain well 48 in the control piston 22. This causes the squeeze water pressure on squeeze water port 30 and on the outside of the product water storage tank to fall to atmospheric pressure. However, the check valve previously mentioned prevents product water from flowing back out of product water connection 34, and of course because the dispensing valve is now closed, product water cannot flow out of the product water connection 34 through the dispensing valve, so the control piston 22 will stop at the position shown in FIG. 3. Under this condition, the pressure on the outside of the bladder in the product water storage tank is essentially atmospheric, and the feed water flow past the reverse osmosis membrane and through feed water port 28 is restricted. During this time, product water is being produced, thereby filling the storage tank with product water, after which product water pressure will increase as previously described, moving the control piston 22 to the far right position shown in FIG. 1, shutting the system off.

However in the prior art systems, the low speed of movement of the control piston proved to be of vital importance for proper operation of the control valve. The vent/drain well of the piston in the prior art systems was cut at 90 degree angles. This has been found to cause at least two problems in the best present-day systems.

The first problem is that the width of the channel of the vent/drain well 48 from one wall to the other wall represents the time between squeeze venting and system shut down. Using the latest reverse osmosis membrane technology for current high product water production rates of 60 to 100 gallons per day achievable in the newest reverse osmosis filtering systems, such as those of U.S. Pat. No. 7,601,256, the faster water causes the control piston 22 to move from the full squeeze position (dispensing) (FIG. 2) through squeeze water exhaust position (FIG. 3) to shutdown (FIG. 1) and never make water. This would only occur during the initial startup phase of the reverse osmosis filter system. Still, the system would not work right out of the box.

This problem is solved in the present invention by chamfering at least one side of the vent/drain well 48 in the control piston 22 as shown in the Figs. For the purposes of this specification, "chamfering" the side of the vent/drain well 48 means providing an angled wall on the vent/drain well as shown in the Figs. The "chamfering" extends into the vent/drain well 48 sufficiently further than the O-ring 44 such that the "chamfering" provides a path past the O-ring 44 that opens slowly as the control piston 22 moves to the right. The "chamfering" may extend to the full depth of the vent/drain well 48 as shown in the Figs. so that the "chamfering" connects the outer cylindrical surface of the control piston 22 to the parallel cylindrical surface at the bottom of the vent/drain well.

The chamfering of the side of the vent/drain well 48 achieves two things. First it starts venting the squeeze water past O-ring 44 early and slowly. This allows the system to stabilize and avoids or minimizes any momentary maintenance of product water pressure after venting of squeeze water occurs, slowing the movement of control piston 22 to the right and allowing it to stop when the squeeze water is vented past O-ring 44, stopping the flow of product water to the left side of the control piston 22, but holding its volume of water by the check valve previously described. Then when the system fills to product water storage tank bladder capacity, the product water pressure increases to supply more product water through product water connection 34, whereby the control piston 22 now continues the movement toward the right to finish the cycle to the full shut down as shown in FIG. 1.

Finally, the chamfering of the vent/drain well 48 also prevents the otherwise square corner of the vent/drain well 48 from catching the O-ring 44, and provides a self-centering action to avoid that problem.

In some embodiments, the control valve (as illustrated in FIGS. 1-3) can generate a phantom (or harmonic) noise as the control piston 22 moves to the right. For example, as the control piston 22 moves to the right, an outer periphery around the right end of the control piston 22 can rub against O-ring 42 while the restricted feed water flows in flow path 40. The rubbing and/or the flow of the restricted feed water can generate a disturbing phantom noise. To eliminate or significantly reduce the noise, recesses or cavities can be incorporated into the control piston 22.

Figure 4:
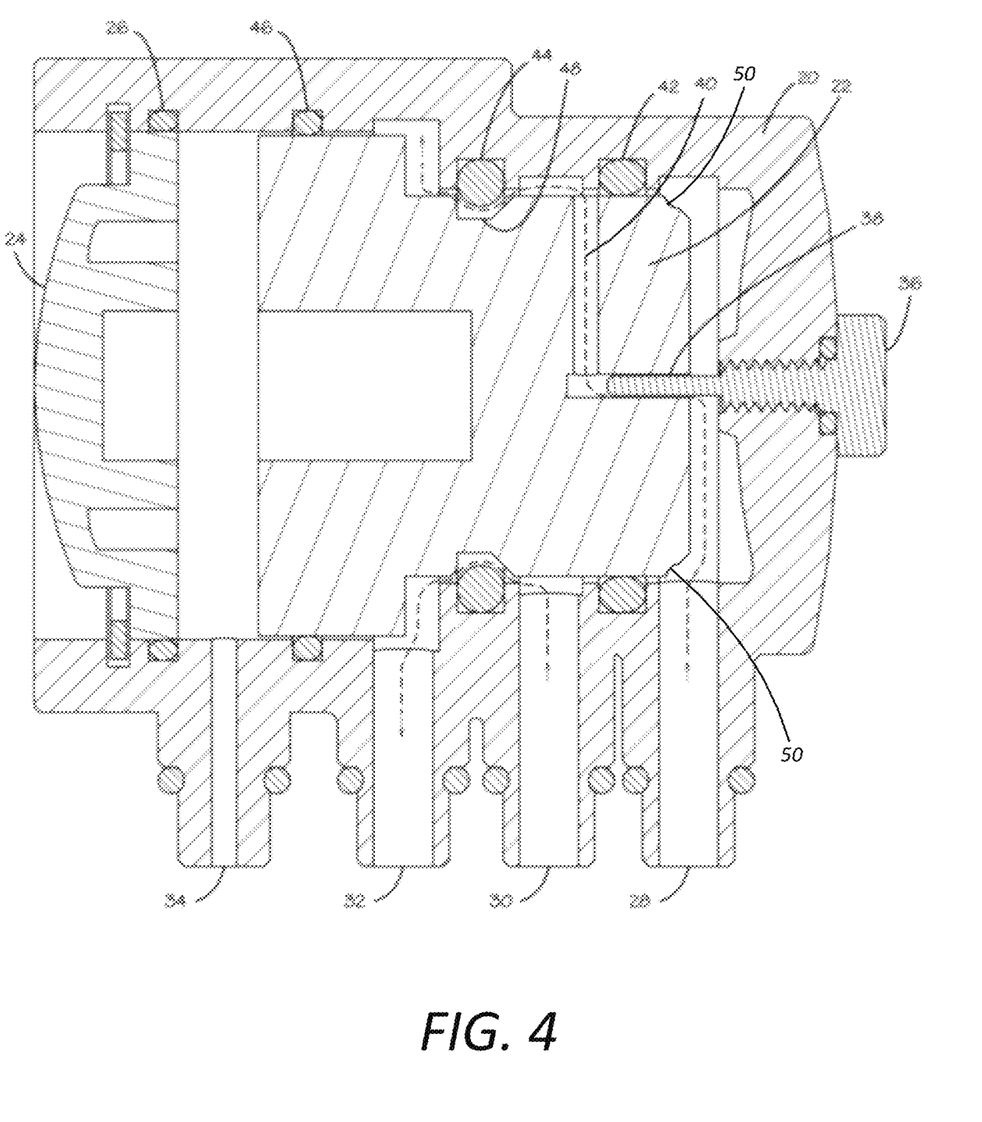
FIG. 4 illustrates the control valve of FIG. 1 with the right end of a control piston having recesses spaced inward from an outer periphery of the control piston according to an embodiment.

FIG. 4 illustrates the control valve of FIG. 1 with the right end of the control piston 22 having recesses or cavities 50 that are spaced inward from an outer periphery or side of the control piston 22. Recesses 50 may be disposed around the right end of the control piston 22. In an embodiment, recesses 50 may extend from the non-tapered portion to the tapered portion of the control piston 22. In another embodiment, recesses 50 may be disposed only on the non-tapered portion or the tapered portion of the control piston 22. The size of recesses 50 may vary such as in the range of millimeters (e.g., approximately 1 mm in thickness).

In operation, as the control piston 22 moves to the right, the rubbing or friction between the outer periphery around the right end of the control piston 22 and O-ring 42 is significantly reduced due to the gap or space created by recesses 50. Moreover, the restricted feed water would also be allowed to flow through one or more recesses 50 in flow path 40, thereby eliminating or significantly reducing the phantom noise.

Figure 5:
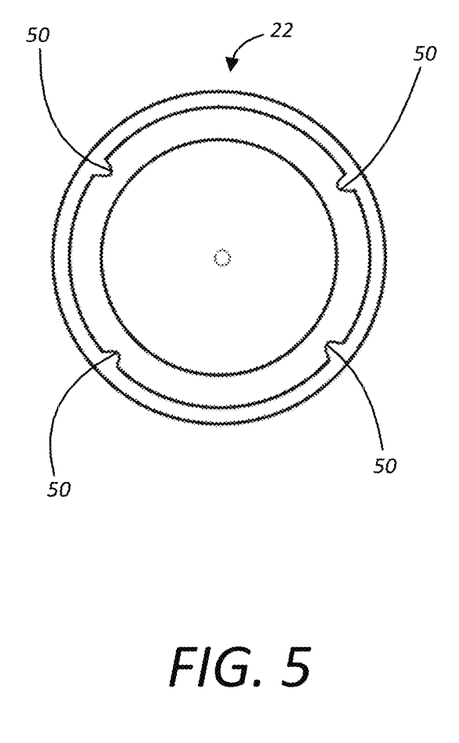
FIG. 5 is a top view of an example control piston according to an embodiment.

FIG. 5 is a top view of an example control piston according to an embodiment. In FIG. 5, control piston 22 includes four recesses 50 (e.g., arcuate recesses), though any number of recesses may be included in the control piston 22 depending on the design of the control valve. As shown, the recesses 50 are disposed around an end of the control piston 22 and are spaced inward from an outer periphery of the control piston 22. In this example, the recesses 50 are approximately equally spaced from one another, though other configurations can be incorporated.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A control valve for a reverse osmosis water purifying system, the control valve comprising:
    a housing having a feed water port, a squeeze water port, a drain port, and a product water connection, each of which open into a bore;
    a first O-ring located in the bore between the feed water port and the squeeze water port;
    a second O-ring located in the bore between the squeeze water port and the drain port;
    a third O-ring located in the bore between the drain port and the product water connection; and
    a control piston moveably located in the bore of the housing, the control piston including a vent/drain well in which a side is chamfered and at least one recess disposed around an end of the control piston, the vent/drain well providing a fluid passage between the squeeze water port and the drain port when the vent/drain well passes over the second O-ring, the fluid passage including an opening formed between the second O-ring and the chamfered side of the vent/drain well.

2. The control valve of claim 1, wherein
    the chamfered side of the vent/drain well extending to a full depth of the vent/drain well to provide a flow path past the second O-ring that opens as the control piston moves toward the feed water port from a position furthest from the feed water port;
    when the flow path is opened, a restricted feed water flows through the at least one recess in the flow path being coupled to the drain port through the vent/drain well in the control piston.

3. The control valve of claim 1, wherein the at least one recess is spaced inward from an outer periphery of the control piston.

4. The control valve of claim 3, wherein the at least one recess comprises four recesses that are approximately equally spaced from one another.

5. The control valve of claim 4, wherein the at least one recess extends from a non-tapered portion to a tapered portion of the control piston.

6. The control valve of claim 1, wherein the control piston is stopped when squeeze water is vented past the second O-ring.

7. The control valve of claim 1, wherein the chamfered side of the vent/drain well extends from an outer cylindrical surface of the control piston to a parallel cylindrical surface at a bottom of the vent/drain well.

8. The control valve of claim 1, wherein the control piston includes a first flow path that provides a slow but positive rate of feed water flow from the feed water port to the squeeze water port when the first flow path is not blocked by the first O-ring.

9. The control valve of claim 8, wherein the control piston further cooperates with the third O-ring to block flow between the drain port and the product water connection when the control piston is at a position closest to the feed water port.

10. The control valve of claim 2, wherein the control piston moves past the first O-ring to directly couple the feed water port to the squeeze water port when the control piston is at the position furthest from the feed water port.

11. A method for controlling a reverse osmosis water purifying system, the method comprising:
    coupling reverse osmosis filter membrane waste water at tap water pressure to a feed water port of a control valve;
    coupling a product water storage tank to a product water connection of the control valve through a check valve that prevents reverse flow from the product water connection back to the product water storage tank;
    coupling a product water dispensing valve to the product water connection of the control valve such that the check valve prevents reverse flow from the product water dispensing valve back to the product water storage tank;

opening the product water dispensing valve to move a control piston in the control valve to a position furthest from the feed water port and thereby coupling the feed water port to a squeeze water port of the control valve to pressurize an outer surface of a bladder in the product water storage tank; and closing the product water dispensing valve to move the control piston toward the feed water port and thereby coupling the squeeze water port and a drain port of the control valve and reduce the pressure on the outer surface of the bladder, wherein the control piston includes a vent/drain well in which a side is chamfered and at least one recess disposed around an end of the control piston, the vent/drain well providing a fluid passage between the squeeze water port and the drain port when the vent/drain well passes over an O-ring, the fluid passage including an opening formed between the O-ring and the chamfered side of the vent/drain well.

12. The method of claim 11, wherein
the chamfered side of the vent/drain well extending to a full depth of the vent/drain well to provide a flow path past the O-ring that opens as the control piston moves toward the feed water port from the position furthest from the feed water port, and
when the flow path is opened, a restricted feed water flows through the at least one recess in the flow path being coupled to the drain port through the vent/drain well in the control piston.

13. The method of claim 11, wherein the at least one recess is spaced inward from an outer periphery of the control piston.

14. The method of claim 13, wherein the at least one recess comprises four recesses that are approximately equally spaced from one another.

15. The method of claim 14, wherein the at least one recess extends from a non-tapered portion to a tapered portion of the control piston.

16. The method of claim 11, the control piston being stopped when squeeze water is vented past the O-ring.

17. The method of claim 11, wherein the chamfered side of the vent/drain well extends from an outer cylindrical surface of the control piston to a parallel cylindrical surface at a bottom of the vent/drain well.

18. The method of claim 11, further comprising providing a slow but positive rate of feed water flow from the feed water port to the squeeze water port when the vent/drain well is over the O-ring.

19. The method of claim 18, further comprising blocking flow between the drain port and the product water connection when the control piston is at a position closest to the feed water port.

20. The method of claim 11, further comprising coupling the feed water port directly to the squeeze water port when the control piston is at the position furthest from the feed water port.

* * * * *